United States Patent
Richardson et al.

(10) Patent No.: US 10,288,312 B2
(45) Date of Patent: May 14, 2019

(54) INSULATING SHELL FOR 2.1 GALLON THERMAL EXPANSION TANKS FOR POTABLE WATER SYSTEMS

(71) Applicant: Professional Trade Manufacturing, LLC, Winston-Salem, NC (US)

(72) Inventors: Robert Dennis Richardson, Winston-Salem, NC (US); Gary Ray Schambach, Advance, NC (US); Paul Gerard Freer, Winston-Salem, NC (US)

(73) Assignee: PROFESSIONAL TRADE MANUFACTURING, LLC, Winston-Salem, NC (US)

( * ) Notice: Subject to any disclaimer, the term of this patent is extended or adjusted under 35 U.S.C. 154(b) by 0 days.

(21) Appl. No.: 16/007,692

(22) Filed: Jun. 13, 2018

(65) Prior Publication Data
US 2018/0292107 A1 Oct. 11, 2018

Related U.S. Application Data

(63) Continuation-in-part of application No. 14/931,708, filed on Nov. 3, 2015, now abandoned.

(60) Provisional application No. 62/076,329, filed on Nov. 6, 2014, provisional application No. 62/074,404, filed on Nov. 3, 2014.

(51) Int. Cl.
| | |
|---|---|
| F24H 9/02 | (2006.01) |
| F24H 1/18 | (2006.01) |
| F16L 59/00 | (2006.01) |
| F17C 3/04 | (2006.01) |
| F24D 3/10 | (2006.01) |

(52) U.S. Cl.
CPC ............. *F24H 1/182* (2013.01); *F16L 59/00* (2013.01); *F17C 3/04* (2013.01); *F24H 9/02* (2013.01); *F24D 3/1008* (2013.01)

(58) Field of Classification Search
CPC .................................... F24H 1/182; F24H 9/02
USPC .................................... 220/592.2, 4.24, 4.21
See application file for complete search history.

(56) References Cited

U.S. PATENT DOCUMENTS

| | | | | |
|---|---|---|---|---|
| 2,624,451 | A * | 1/1953 | Ewing | A47J 39/00 126/261 |
| 2,642,851 | A * | 6/1953 | McFerran | F24H 1/182 122/494 |
| 4,375,262 | A * | 3/1983 | Hrenyo | B65D 75/22 206/418 |
| 6,420,442 | B1 * | 7/2002 | Dietzen | C08J 9/0038 521/146 |

(Continued)

*Primary Examiner* — Stephen J Castellano

(57) ABSTRACT

An insulating shell designed to fit a variety of thermal expansion tanks which provides substantial insulation. The insulation shell includes a first half shell, a second half shell, and an interlocking mechanism. The first half shell and the second half shell join together to form an enclosed shell with a hollow interior. The first half shell and the second half shell each include a main body, a central cavity, and a hole. The main body provides the thermal insulation. The central cavity laterally traverses into the main body through a planar mating surface and receives the tank. The hole traverses into the main body from an external surface to an internal surface and received associated plumbing of the tank. The interlocking mechanism includes a first engaging element and a second engaging element, which are used to attach the first half shell and the second half shell together.

15 Claims, 8 Drawing Sheets

(56) References Cited

U.S. PATENT DOCUMENTS 8,919,598 B2 * 12/2014 Kampf ................. E04C 2/30
220/4.04
2006/0144346 A1 * 7/2006 Gordon ................. F24H 1/182
122/19.2

* cited by examiner

INSULATING SHELL FOR 2.1 GALLON THERMAL EXPANSION TANKS FOR POTABLE WATER SYSTEMS

The current application claims a priority to the U.S. Nonprovisional patent application Ser. No. 14/931,708 filed on Nov. 3, 2015, now abandoned which claims priority to the U.S. Provisional Patent application Ser. No. 62/076,329 filed on Nov. 6, 2014 and the U.S. Provisional Patent application Ser. No. 62/074,404 filed on Nov. 3, 2014.

FIELD OF THE INVENTION

The present invention relates generally to insulation for thermal expansion tanks used in closed water heating systems. More particularly, present invention is an insulating shell for thermal expansion tanks which includes two molded halves shaped to the contours of the thermal expansion tank.

BACKGROUND OF THE INVENTION

A thermal expansion tank is a small steel or fiberglass tank used to protect closed water systems, such as cold potable water systems and domestic hot water systems, from excessive pressure. One side of the tank is connected to the pipe work of the heating system and therefore contains water. The other side is partially filled with air, whose compressibility cushions shock caused by pressure surges and absorbs excess water pressure caused by thermal expansion.

In regions with perennially cold climates or cold winters, pipe work supplying water to the thermal expansion tanks may be susceptible to freezing, especially if the tank is placed in an attic, garage, or other near-exterior location of the building. If the water supplied to and in the thermal expansion tank freezes, the effectiveness of the system is severely reduced and, in the worst case, can result in catastrophic failure of the water heater system. For this reason, many governments have imposed insulation requirements for thermal expansion tanks. In the United States, requirements vary by state. A problem exists in that many current insulation methods are ad-hoc and may allow a person to work on (or tamper) with a thermal expansion tank without having to fully remove the insulation. This is a potentially dangerous practice because if a person can work on the tank without removing any insulation, he or she may be inclined to skip reading warning labels as well as inspecting the tank for leaks or other structural damage.

Therefore, it is an object of the present invention to provide an efficient, safe, and standardized method of insulating a variety of different thermal expansion tanks wherein two molded halves of a foam shell are attached to the thermal expansion tank and held in place with binding means, creating a thermal envelope around the tank.

DETAIL DESCRIPTIONS OF THE INVENTION

All illustrations of the drawings are for the purpose of describing selected versions of the present invention and are not intended to limit the scope of the present invention.

The present invention generally relates to insulation devices for thermal expansion tanks of closed water heat systems. In particular, the present invention is an insulating shell which includes two molded half-shells that is used to prevent freezing in thermal expansion tanks of water heat systems. The present invention is designed to provide a universal fit for 2.1 gallon thermal expansion tanks made by over eight different manufacturers. The present invention is made for use in residential construction and meets the plumbing code, fire code, and building code requirements. In particular, the present invention meets ASTM C-177 requirements of the NC plumbing code which requires minimum R-value of 6.5 or greater on water pipe insulation in unconditioned areas. The present invention provides an R-value of 8.1 at 1.75 inch thickness. Furthermore, the present invention provides and is properly labeled to show Flame Spread Index of 5 and Smoke Developed Index of 25.

Figure 1:
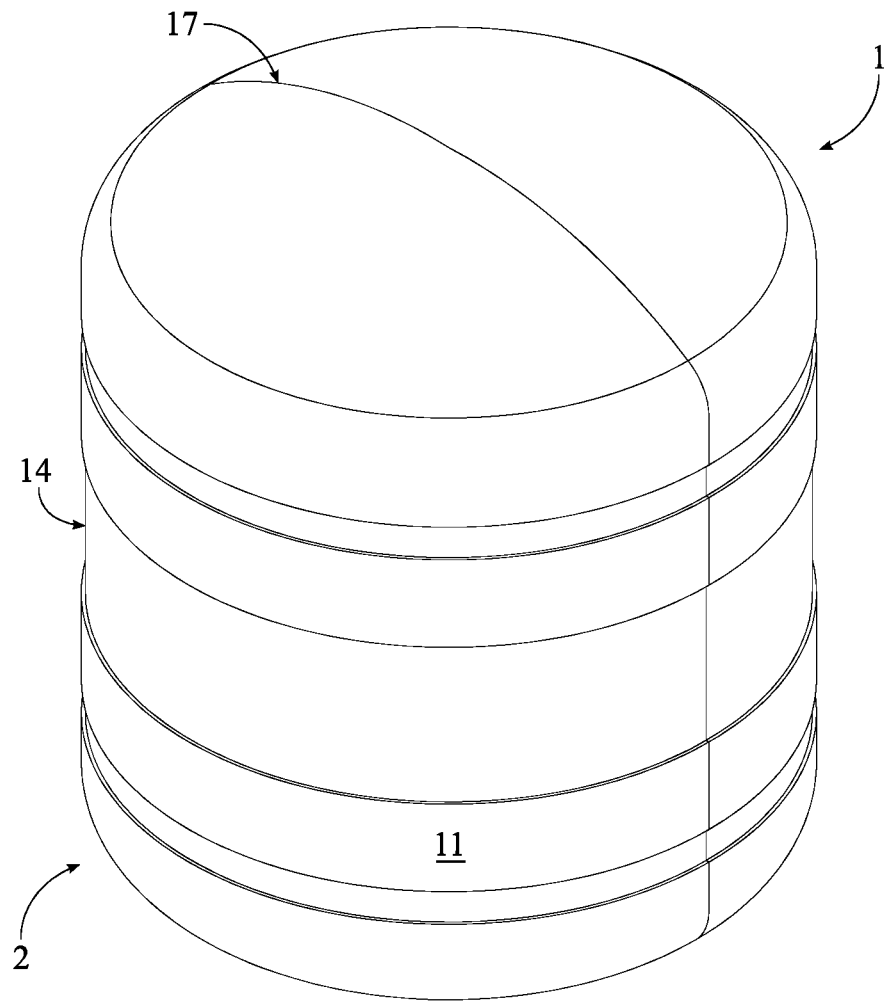
FIG. 1 is a perspective view of the present invention.
Figure 2:
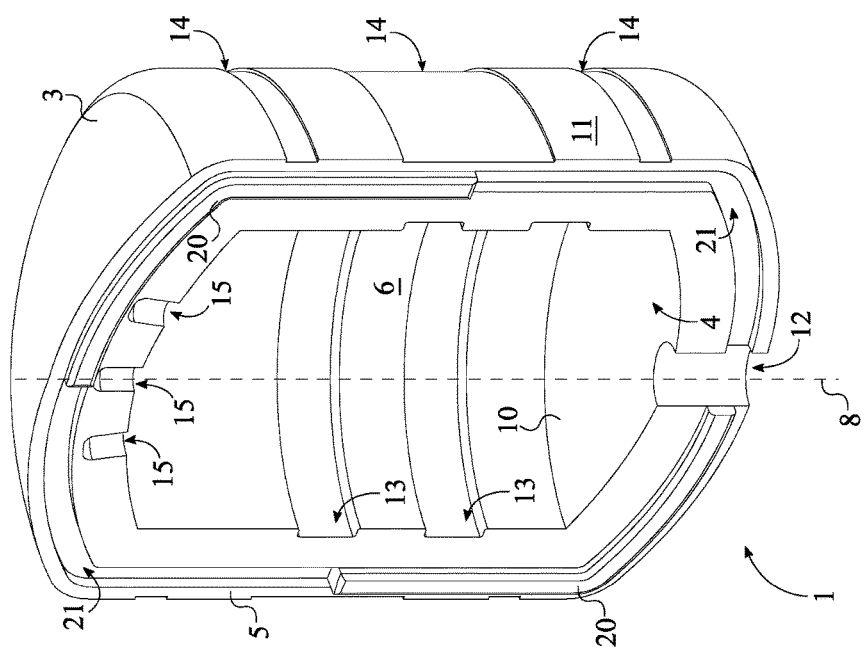
FIG. 2 is an exploded perspective view of the present invention.
Figure 2:
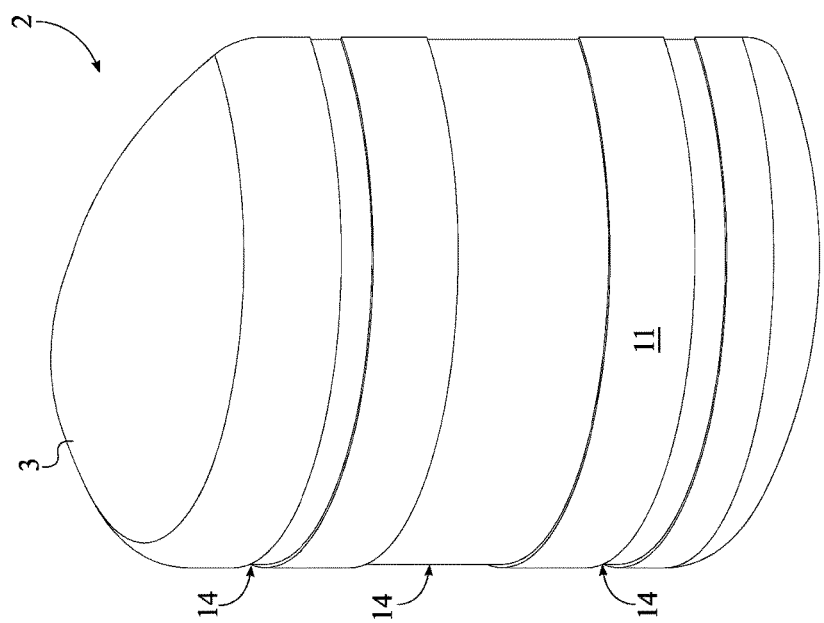

Referring to FIG. 1 and FIG. 2, the present invention comprises a first half shell 1, a second half shell 2, and an interlocking mechanism 17. The first half shell 1 and the second half shell 2 are identical in design and are detachably joined together to form a closed shell having a hollow interior volume. The hollow interior volume is shaped and sized to form-fit around a variety of thermal expansion tanks. The first half shell 1 and the second half shell 2 each comprise a main body 3, a central cavity 4, and a hole 12. The main body 3 provides the thermal insulation for the thermal expansion tank, protecting it from cold temperatures that could otherwise lead to freezing of water within the tank. Frozen water inside the thermal expansion tank could potentially result in structural or function failure in the adjoining water heat system. The central cavity 4 laterally traverses into the main body 3 from a planar mating surface 5 of the main body 3 and is shaped/sized to receive half of the thermal expansion tank. More specifically, the central cavity 4 of the first half shell 1 and the central cavity 4 of the second half shell 2 are sized to combine to fit a thermal expansion tank with a diameter of 8.25 inches and a height of 10.5 inches as this is a highly standard design used in the industry. The planar mating surface 5 is a flat surface which allows the first half shell 1 to be positioned adjacent to the second half shell 2 in a flush manner, ensuring there are no breaks in the insulating layer provided by the present invention. The central cavity 4 delineates an inner surface 6 that directly presses against the expansion tank. The hole 12 provides a passage for the pipe that connects the thermal expansion tank to the rest of the water heater system. The hole 12 laterally traverses through the main body 3 from an external surface 11 of the main body 3 to the inner surface 6. The hole 12 additionally traverses into the planar mating surface 5. Resultantly, the hole 12 is communicated with the central cavity 4. The inner surface 6 and the external surface 11 are separated by a shell wall, the thickness of which is preferably uniform and may vary to accommodate various insulation needs of the thermal expansion tank.

Figure 4:
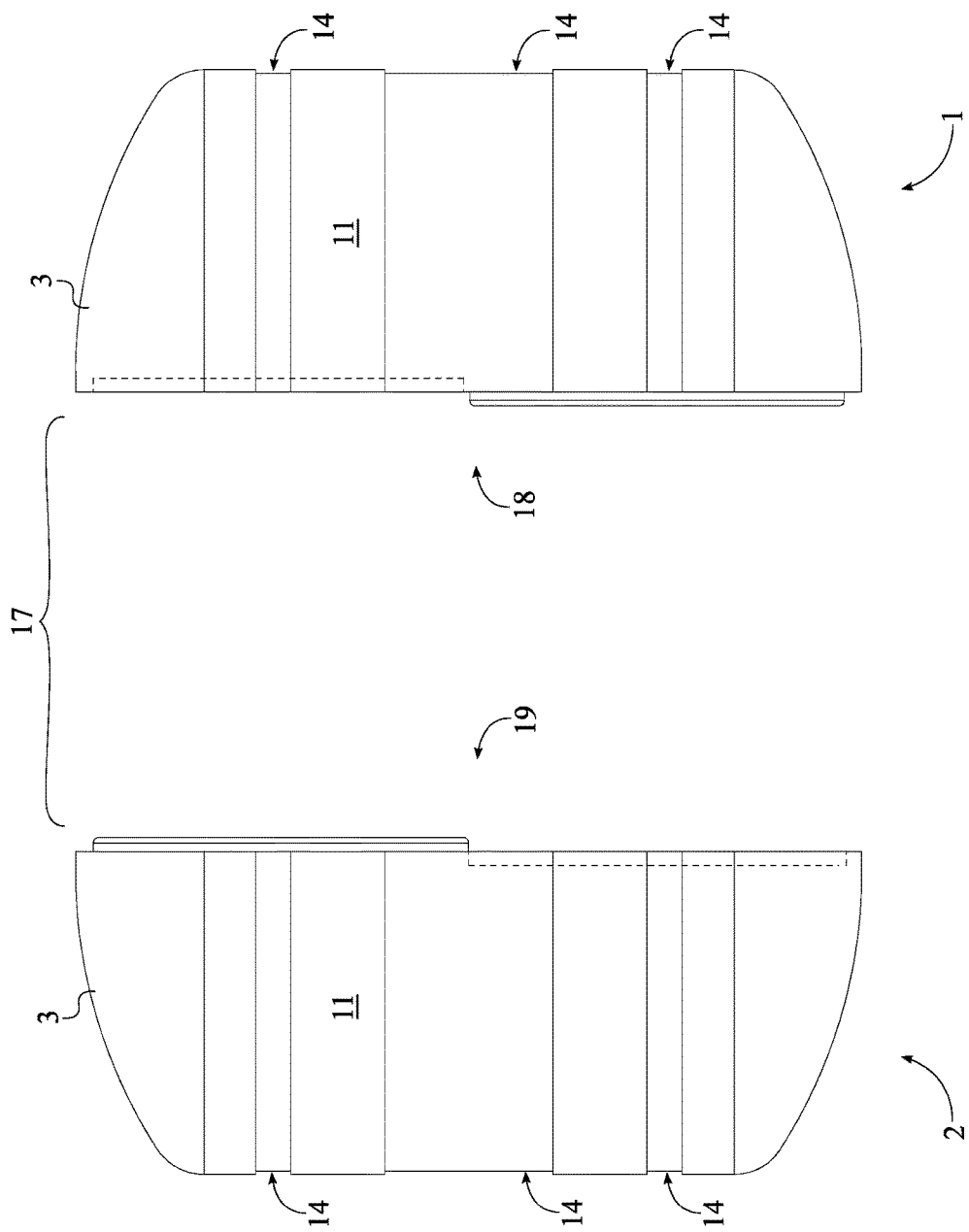
FIG. 4 is an exploded side-view of the present invention, depicting the interlocking mechanism.

The interlocking mechanism 17 attaches the first half shell 1 and the second half shell 2 together. The interlocking mechanism 17 comprises a first engaging element 18 and a second engaging element 19 as seen in FIG. 4. The first engaging element 18 is integrated into the planar mating surface 5 of the first half shell 1, around the central cavity 4 of the first half shell 1. In a similar fashion, the second engaging element 19 is integrated into the planar mating surface 5 of the second half shell 2, around the central cavity 4 of the second half shell 2. A variety of designs and mechanisms may be used for the first engaging element 18 and the second engaging element 19 including, but not limited to, hook-and-loop fasteners, snap fasteners, stud and receiving hole fasteners, screws, and bolts. In order to lock the interlocking mechanism 17, the planar mating surface 5 of the first half shell 1 is perimetrically and adjacently positioned with the planar mating surface 5 of the second half shell 2. This engages the first engaging element 18 to the second engaging element 19, thus securing the first half shell 1 and the second half shell 2 to each other in an air-tight manner.

Figure 3:
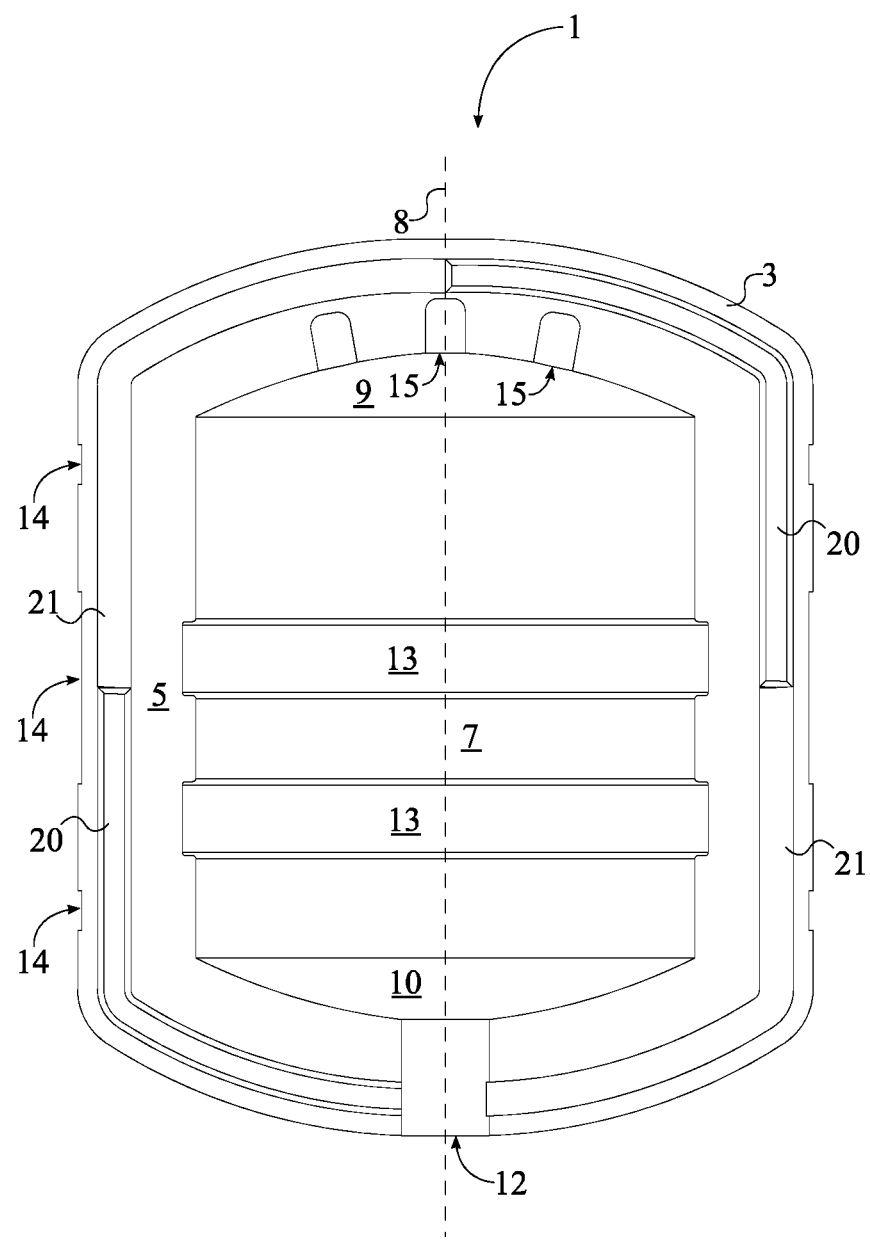
FIG. 3 is a side-view of a first half shell of the present invention.
Figure 5:
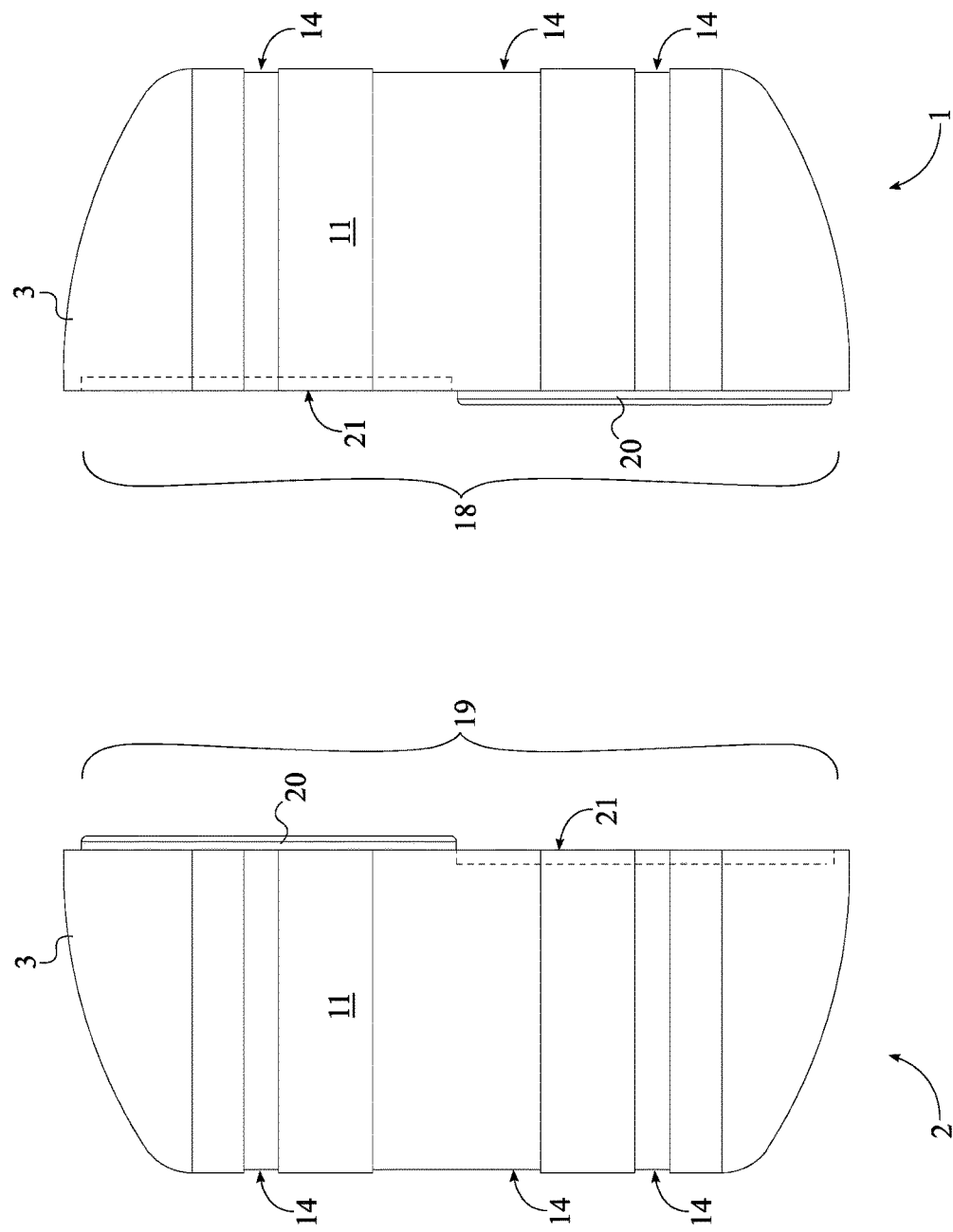
FIG. 5 is an exploded side-view of the present invention, depicting the constituents of the interlocking mechanism.

Referring to FIG. 3 through FIG. 5, in the preferred embodiment of the present invention, the first engaging element 18 and the second engaging element 19 each comprise an at least one lip 20 and an at least one groove 21. The lip 20 and the groove 21 are sized and shaped such that the lip 20 fits in the groove 21 in a flush manner. The cross-section of the lip 20 and the groove 21 is preferably of a rectangular design. This increases the contact surface between the lip 20 and the groove 21, thus creating a significantly strong dry-friction connection which holds the lip 20 inside the groove 21. The lip 20 of the first engaging element 18 is adjacently connected to the planar mating surface 5 around the central cavity 4 of the first half shell 1. Additionally, the groove 21 of the first engaging element 18 laterally traverses into the planar mating surface 5 around the central cavity 4 of the first half shell 1. The lip 20 and the groove 21 together extend to preferably cover the entire length of the planar mating surface 5 around the central cavity 4, thus fully surrounding the central cavity 4 to ensure there are no thermal breaks in between the first half shell 1 and the second half shell 2. The second engaging element 19 is integrated into the second half shell 2 in the exact same manner as the first engaging element 18 is integrated into the first half shell 1. More specifically, the lip 20 of the second engaging element 19 is adjacently connected to the planar mating surface 5 around the central cavity 4 of the second half shell 2. Additionally, the groove 21 of the second engaging element 19 laterally traverses into the planar mating surface 5 around the central cavity 4 of the second half shell 2. To attach the first half shell 1 to the second half shell 2, the lip 20 of the first engaging element 18 is interlocked within the groove 21 of the second engaging element 19 and the lip 20 of the second engaging element 19 is interlocked within the groove 21 of the first engaging element 18.

In the preferred embodiment of the present invention, the main body 3 of the first half shell 1 and the main body 3 of the second half shell 2 are each composed of a rigid thermal insulation foam. A variety of different types of foams may be used for the present invention in order to meet the insulation requirements set forth by government agencies. One particular example is Neopor foam, which can yield an R-value of 8.1 when the sidewall thickness of the main body 3 is 1.75 inches. An alternative material is expanded polystyrene, which can yield an R-value of 7.1 when the sidewall thickness of the main body 3 is 1.75 inches. Alternative sidewall thickness values as well as material composition of the main body 3 for the first half shell 1 and the second half shell 2 may be utilized in order to yield varying degrees of insulation. It is preferred that the main body 3 of the first half shell 1 and the main body 3 of the second half shell 2 are each composed of graphite polystyrene, allowing the main body 3 of the first half shell 1 and the main body 3 of the second half shell 2 to withstand attic temperatures ranging from −30 to +200 degrees Fahrenheit. Graphite polystyrene is polystyrene foam with graphite that achieves an R-value of 8.1 when the sidewall thickness of the main body 3 is 1.75 inches. Resultantly, the graphite polystyrene ensures that the present invention is water proof, unlike fiberglass insulation and flexible vent pipe insulation that is not recommended by the manufacturers for insulation of water piping. Additionally, the graphite polystyrene composition ensures that the present invention is rodent resistant. The preferred graphite polystyrene is NEOPOR F-2400 made by BASF.

The first half shell 1 and the second half shell 2 are each manufactured from a single-injection mold, a cheaper and faster alternative to modern approaches. Normal approaches to forming an insulation cover includes using an outer shell and an inner shell with insulation material being placed or injected in between, thus requiring additional assembly time, labor, and manufacturing of additional parts. Because the present invention is two instances of a single part, the costs associated with installment, labor, manufacturing, and maintenance are significantly decreased. In particular, only one mold is required to manufacture both of the necessary components of the present invention. Resultantly, the present invention can be removed and reinstalled in less than two minutes. This provides for easy inspection and repair if needed. This also addresses the need for in the home construction industry to minimize labor expenses.

Figure 6:
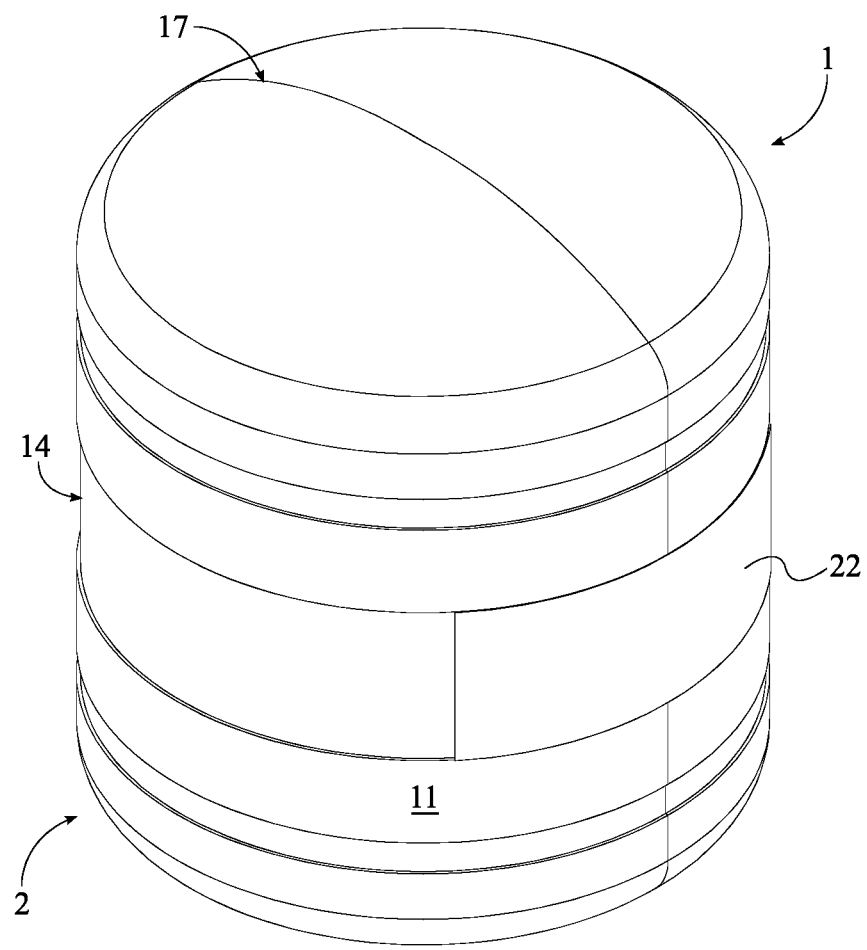
FIG. 6 is a perspective view of an alternative embodiment of the present invention.
Figure 7:
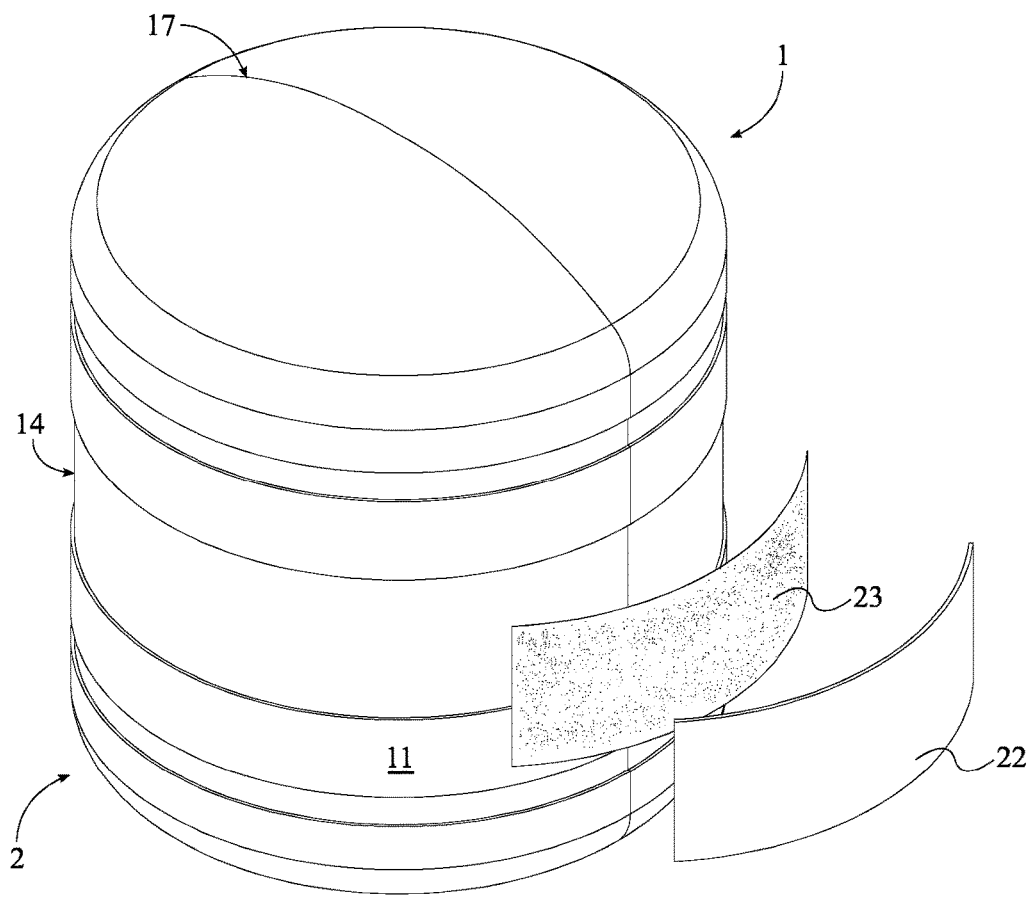
FIG. 7 is a perspective view of the alternative embodiment of the present invention in a partial exploded state.

Referring to FIG. 6 and FIG. 7, the present invention further comprises a fastening label 22 and an adhesive 23. The fastening label 22 is a two by three inch piece of paper, fabric, plastic, or other similar material which contains descriptive information regarding to the thermal expansion tank housed by the present invention; although different sized designs may also be utilized. The fastening label 22 is also laminated to not rip or shear or flake under various stresses as well as extreme temperatures. Descriptive information may include, but is not limited to, date of installation, system water pressure, pressure of the thermal expansion tank, name of the installer, phone number, date of inspection, and name of the inspector, and any other pertinent information. More importantly, the fastening label 22 in conjunction with the adhesive 23 provide a novel means for fastening the first half shell 1 and the second half shell 2 together for an extended period of time in an environment with temperatures ranging from −10 to +200 degrees Fahrenheit. The fastening label 22 is positioned adjacent to the external surface 11 of the first half shell 1 and the external surface 11 of the second half shell 2. The fastening label 22 extends over the first half shell 1 and the second half shell 2, thus crossing over and covering the seam between the first half shell 1 and the second half shell 2. The adhesive 23 secures the fastening label 22 to the first half shell 1 and the second half shell 2, and thus fastening the first half shell 1 to the second half shell 2. In particular, the fastening label 22 is adjacently attached to the first half shell 1 and the second half shell 2 by the adhesive 23. The preferred adhesive 23 is a tackified acrylic water-based pressure-sensitive adherent. Specifically, the adhesive 23 is an Acucote #31 PB adhesive. When used with polystyrene with graphite material, the Acucote#31 PB provides an adhesive-junction with a high adhesion to low energy surfaces while maintaining a balance or peel and shear. The adhesive 23 physically actually bonds to the polystyrene with graphite to yield a significantly strong junction capable withstanding high and low temperatures. Additionally, the fastening label 22 is easily removed or replaced by slitting the fastening label 22.

In the preferred embodiment, the present invention is configured to insulate thermal expansion tanks that are cylindrically shaped. More specifically, the inner surface 6 comprises a half-cylindrical lateral portion 7, a first semi-circular base portion, and a second semi-circular base portion 10. The half-cylindrical lateral portion 7 is shaped to the press against the curved lateral surface of the thermal expansion tank. The first semi-circular base portion is shaped to press against the top of the thermal expansion tank and thus is adjacently and perpendicularly connected to the half-cylindrical lateral portion 7. The second semi-circular base portion 10 is shaped to press against the base of the thermal expansion tank. As seen in FIG. 3, the second semi-circular base portion 10 is positioned opposite of the first semi-circular base portion, across the half-cylindrical lateral portion 7. Additionally, the semi-circular base portion is adjacently and perpendicularly connected to the half-cylindrical lateral potion. Traditionally, the pipe connecting the thermal expansion tank and the water heater system is coupled to the bottom portion of the thermal expansion tank. To accommodate this design, the hole 12 laterally traverses into the planar mating surface 5 and the second semi-circular base portion 10.

In accordance with the aspect of being generally shaped to form-fit around a variety of standard thermal expansion tanks, the present invention accounts for variability in the design of thermal expansion tanks by providing additional features formed on the inner surface 6 of the first half shell 1 and the second half shell 2. More specifically, the central cavity 4 of the first half shell 1 and the central cavity 4 of the second half shell 2 are designed to accommodate various curvatures, weld locations, and multiple air valve locations to fit multiple different manufactured tank designs. The inside design of the present invention is tailored to accommodate at least four different locations of welds and four different contours of shapes of the various designs for the at least 11 manufacturers of 2.1 gallon thermal expansion tanks for potable water systems. Additionally, the present invention accommodates three different locations of air valves with multiple dimensions of the shape and size of air valve caps.

Figure 8:
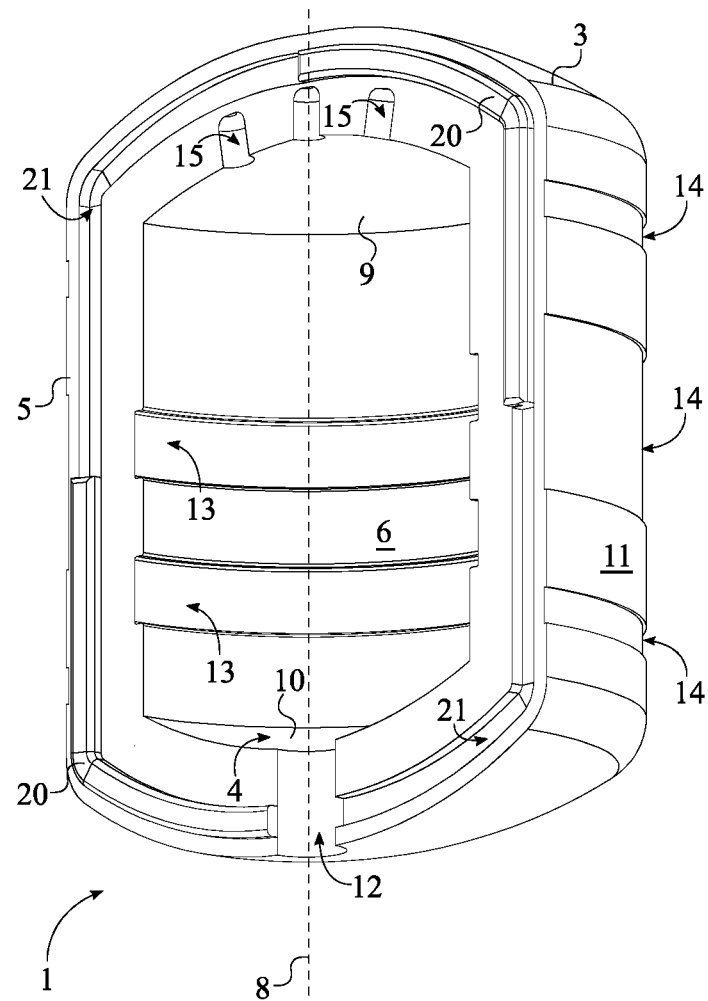
FIG. 8 is a perspective view of the first half shell of the present invention.

Referring to FIG. 2, FIG. 3, and FIG. 8, the first half shell 1 and the second half shell 2 each further comprise an at least one weld-receiving channel 13, an at least one strap-receiving recess 14, and an at least one valve-receiving cavity 15. The weld-receiving channel 13 is a recessed space in the inner surface 6 which receives welds lines that may exist on the exterior surface of thermal expansion tank, thus ensuring a flush fit in between the first half shell 1 and the second half shell 2. The weld-receiving channel 13 laterally traverses into the half-cylindrical lateral portion 7 of the inner surface 6. Additionally, the weld-receiving channel 13 is radially positioned around a central axis 8 of the half-cylindrical lateral portion 7, laterally extending about the inner surface 6. The depth and width of the weld-receiving channel 13 is subject to change in order to accommodate a variety of weld lines and different designs of thermal expansion tanks. Furthermore, the number of weld-receiving channels 13 and their respective positioning may vary to accommodate various future designs of thermal expansion tanks. The weld-receiving cavity 13 of the first half shell 1 and the second half shell 2 match each other in design and position as weld lines usually extent fully around the exterior surface of the thermal expansion tank.

The at least one valve-receiving cavity 15 is designed to receive therein an air valve(s) located on the side of the thermal expansion tank. The valve-receiving cavity 15 laterally traverses into the main body 3 from the planar mating surface 5 and the first semi-circular base portion. Because air valves are usually located at the top portion of the thermal expansion tank, the valve-receiving cavity 15 is positioned opposite of the hole 12, across the main body 3. Additionally, the valve-receiving cavity 15 is communicated with the central cavity 4. The shape of the valve-receiving cavity 15 is preferably semi-cylindrical such that a full cylindrical hollow space is created when the first half shell 1 and the second half shell 2 are joined and their respective valve-receiving cavities are positioned next to each other. In the preferred embodiment of the present invention, there are three instances of the valve-receiving cavity 15 that are radially distributed about the planar mating surface 5 as seen in FIG. 3.

Once placed over the thermal expansion tank, the first half shell 1 and the second half shell 2 are further secured together through a binding means such as plastic tapes, elastic bands, and metal bands. To facilitate accurate placement of such binding means, the strap-receiving recess 14 is used. The strap-receiving recess 14 laterally traverses into the external surface 11 and is radially positioned around the central axis 8 of the half-cylindrical lateral portion 7. The depth and width of the strap-receiving recess 14 may change to accommodate various different binding means. In the preferred embodiment of the present invention, there are three instances of the strap-receiving recess 14 to increase the versatility of the present invention.

In another embodiment of the present invention, the at least one lip 20 of the first engaging element 18 and the second engaging element 19 each includes a first lip and a second lip. Complementary to this, the at least one groove 21 of the first engaging element 18 and the second engaging element 19 each includes a first groove and a second groove. To ensure an air-tight junction between the first half shell 1 and the second half shell 2, the first engaging element 18 and the second engaging element 19 cover the whole planar mating surface 5 around the central cavity 4 of the first half shell 1 and the second half shell 2, respectively. More specifically, the planar mating surface 5 around the central cavity 4 for the first half shell 1 is divided into four quadrants as seen in FIG. 3. The first lip, the second lip, the first groove, and the second groove each span one quadrant to ensure that there are no thermal breaks when the first half shell 1 and the second half shell 2 are attached. Additionally, it is preferred that the constituents of the first engaging element 18 alternative in a clockwise direction as follows: the first lip, the first groove, the second lip, the second groove. The second engaging element 19 is integrated into the second half shell 2 in the exact same manner as well.

The present invention is specifically constructed to conceal all parts of the thermal expansion tank not only for efficient insulation, but also as a safety measure. Many current insulation methods may allow a person to work on (or tamper) with the thermal expansion tank without having to remove the insulation. This is a potentially dangerous practice because if the person can work on the thermal expansion tank without removing any insulation, he or she may be inclined to skip and read warning labels and inspecting the tank for leaks or other damages. Therefore, by requiring a person to remove the present invention before being able to access the thermal expansion tank for any type of work (air pressure adjustment, tank removal, etc.), that person will be more likely to inspect the thermal expansion tank and read warning labels. It is also contemplated that the present invention could be provided with labels showing information such as the manufacturer and warning labels of the specific thermal expansion tank to which the present invention is applied to.

The present invention is relatively light, an essential characteristic as 2.1 gallon thermal expansion tanks are just suspended from existing water piping with no support. Another unique aspect of the present invention is that there is no numbs, shields, inner shell, outer shell, pieces of cut installation, sheet metal screws, or other items that require additional manufacturing costs, assembly costs, or additional labor during the installment process.

Although the invention has been explained in relation to its preferred embodiment, it is to be understood that many other possible modifications and variations can be made without departing from the spirit and scope of the invention as hereinafter claimed.

What is claimed is:

1. An insulating shell for 2.1 gallon thermal expansion tanks for potable water systems comprising:
    a first half shell;
    a second half shell;
    an interlocking mechanism;
    a fastening label;
    an adhesive;
    the first half shell and the second half shell each comprising a main body, a central cavity and a hole;
    the central cavity laterally traversing into the main body from a planar mating surface of the main body;
    an inner surface being delineated by the central cavity;
    the hole laterally traversing through the main body from an external surface of the main body to the inner surface;
    the hole laterally traversing into the planar mating surface;
    the hole being communicated with the central cavity;
    the first half shell and the second half shell being attached to each other through a first engaging element and a second engaging element of the interlocking mechanism;
    the fastening label being positioned adjacent to the external surface of the first half shell and the external surface of the second half shell;
    the fastening label extending over the first half shell and the second half shell;
    the fastening label being adjacently attached to the first half shell and the second half shell by the adhesive; and
    the adhesive being a tackified acrylic water-based pressure sensitive adhesive.

2. The insulating shell for 2.1 gallon thermal expansion tanks for potable water systems as claimed in claim 1, wherein the main body of the first half shell and the main body of the second half shell are each composed of graphite polystyrene.

3. The insulating shell for 2.1 gallon thermal expansion tanks for potable water systems as claimed in claim 2, wherein the main body of the first half shell and the main body of the second half shell are each composed of graphite polystyrene for allowing the main body of the first half shell and the main body of the second half shell to withstand attic temperatures ranging from −30 to +200 degrees Fahrenheit.

4. The insulating shell for 2.1 gallon thermal expansion tanks for potable water systems as claimed in claim 1, wherein the main body of the first half shell and the main body of the second half shell are each a single-injection mold.

5. The insulating shell for thermal expansion tanks as claimed in claim 1, wherein the adhesive is the tackified acrylic water-based pressure sensitive adhesive which has a high adhesion to low energy surfaces while maintaining a balance of peel and sheer.

6. The insulating shell for 2.1 gallon thermal expansion tanks for potable water systems as claimed in claim 1 comprising:
    the first engaging element being connected with the planar mating surface of the first half shell around the central cavity of the first half shell;
    the second engaging element being connected with the planar mating surface of the second half shell around the central cavity of the second half shell; and
    the planar mating surface of the first half shell being perimetrically and adjacently positioned with the planar mating surface of the second half shell.

7. The insulating shell for 2.1 gallon thermal expansion tanks for potable water systems as claimed in claim 1 comprising:
    the inner surface of the first half shell comprising a half-cylindrical lateral portion, a first semi-circular base portion a second semi-circular base portion;
    the first semi-circular base portion of the first half shell being adjacently and perpendicularly connected to the half-cylindrical lateral portion of the first half shell;
    the second semi-circular base portion of the first half shell being positioned opposite of the first semi-circular base portion of the first half shell across the half-cylindrical lateral portion of the first half shell;
    the second semi-circular base portion of the first half shell being adjacently and perpendicularly connected to the half-cylindrical lateral portion of the first half shell;
    the hole of the first half shell laterally traversing into the planar mating surface of the first half shell and the second semi-circular base portion of the first half shell;
    the inner surface of the second half shell comprising a half-cylindrical lateral portion, a first semi-circular base portion and a second semi-circular base portion;
    the first semi-circular base portion of the second half shell being adjacently and perpendicularly connected to the half-cylindrical lateral portion of the second half shell;
    the second semi-circular base portion of the second half shell being positioned opposite of the first semi-circular base portion of the second half shell across the half-cylindrical lateral portion of the second half shell;
    the second semi-circular base portion of the second half shell being adjacently and perpendicularly connected to the half-cylindrical lateral portion of the second half shell; and
    the hole of the second half shell laterally traversing into the planar mating surface of the second half shell and the second semi-circular base portion of the second half shell.

8. The insulating shell for 2.1 gallon thermal expansion tanks for potable water systems as claimed in claim 1 comprising:
    the first half shell and the second half shell each comprising at least one weld-receiving channel;
    the weld-receiving channel laterally traversing into a half-cylindrical lateral portion of the inner surface; and
    the weld-receiving channel being radially positioned around a central axis of the half-cylindrical lateral portion.

9. The insulating shell for 2.1 gallon thermal expansion tanks for potable water systems as claimed in claim 1 comprising:
   the first half shell and the second half shell each comprising at least one strap-receiving recess;
   the strap-receiving recess laterally traversing into the external surface; and
   the strap-receiving recess being radially positioned around a central axis of a half-cylindrical lateral portion.

10. The insulating shell for 2.1 gallon thermal expansion tanks for potable water systems as claimed in claim 1 comprising:
   the first half shell and the second half shell each comprising at least one valve-receiving cavity;
   the valve-receiving cavity of the first half shell laterally traversing into the main body of the first half shell from the planar mating surface of the first half shell and a first semi-circular base portion of the first half shell;
   the valve-receiving cavity of the first half shell being positioned opposite of the hole of the first half shell across the main body of the first half shell;
   the valve-receiving cavity of the first half shell being communicated with the central cavity of the first half shell;
   the valve-receiving cavity of the second half shell laterally traversing into the main body of the second half shell from the planar mating surface of the second half shell and a first semi-circular base portion of the second half shell;
   the valve-receiving cavity of the second half shell being positioned opposite of the hole of the second half shell across the main body of the second half shell; and
   the valve-receiving cavity of the second half shell being communicated with the central cavity of the second half shell.

11. The insulating shell for 2.1 gallon thermal expansion tanks for potable water systems as claimed in claim 1 comprising:
   the first engaging element and the second engaging element each comprising at least one lip and at least one groove;
   the lip of the first engaging element being adjacently connected to the planar mating surface around the central cavity of the first half shell;
   the groove of the first engaging element laterally traversing into the planar mating surface around the central cavity of the first half shell;
   the lip of the second engaging element being adjacently connected to the planar mating surface around the central cavity of the second half shell; and
   the groove of the second engaging element laterally traversing into the planar mating surface around the central cavity of the second half shell.

12. The insulating shell for 2.1 gallon thermal expansion tanks for potable water systems as claimed in claim 11 comprising:
   the lip of the first engaging element being interlocked within the groove of the second engaging element; and
   the lip of the second engaging element being interlocked within the groove of the first engaging element.

13. The insulating shell for 2.1 gallon thermal expansion tanks for potable water systems as claimed in claim 1, wherein the main body of the first half shell and the main body of the second half shell are each composed solely of a rigid thermal insulation foam.

14. The insulating shell for 2.1 gallon thermal expansion tanks for potable water systems as claimed in claim 1, wherein the central cavity of the first half shell and the central cavity of the second half shell combine to fit a tank with a diameter of 8.25 inches and a height of 10.5 inches.

15. The insulating shell for 2.1 gallon thermal expansion tanks for potable water systems as claimed in claim 1, wherein the central cavity of the first half shell and the central cavity of the second half shell are designed to accommodate various curvatures, weld locations and multiple air valve locations to fit multiple different manufactured tank designs.

\* \* \* \* \*